United States Patent [19]

Alessio et al.

[11] 3,761,770

[45] Sept. 25, 1973

[54] COMBINED COMPONENT AND INTERCONNECTION MODULE AND METHOD OF MAKING

[75] Inventors: Sergio A. Alessio, Elmhurst; Weichien Chow, Park Forrest, both of Ill.; Mario Kosem, Willoughby Hills, Ohio; Charles F. Valach, Western Springs, Ill.

[73] Assignee: The Bunker-Ramo Corporation, Oak Brook, Ill.

[22] Filed: Mar. 20, 1972

[21] Appl. No.: 235,993

Related U.S. Application Data

[62] Division of Ser. No. 48,317, June 22, 1970, Pat. No. 3,703,033.

[52] U.S. Cl. .......................... 317/101 CC, 174/72 A

[51] Int. Cl. ............................................ H05k 1/04

[58] Field of Search ............. 317/101 CM, 101 CC, 317/122; 174/72 A

[56] References Cited

UNITED STATES PATENTS

| | | | |
|---|---|---|---|
| 3,626,086 | 12/1971 | Rubey | 317/101 CC |
| 3,323,023 | 5/1967 | Walker | 317/101 CC |
| 3,418,535 | 12/1968 | Martinell | 317/101 CC |
| 3,441,805 | 4/1969 | Paulson | 317/101 CC |

*Primary Examiner*—David Smith, Jr.
*Attorney*—Frederick M. Arbuckle

[57] ABSTRACT

A combined component and interconnection module having a plurality of components, such as integrated circuit modules, directly mounted to and electrically connected with an interconnection pattern so as to avoid the need for the conventional printed circuit board or other external means normally required to provide interconnections between these components. The interconnection pattern is formed using computer-controlled winding apparatus to form wire loops in predetermined slots of a core in a predetermined sequence, the wire loops on one side of the core being cut to permit the remaining loops to provide the desired interconnection pattern. The components of the combined module are mechanically and electrically connected to the core and interconnection pattern by component terminals which pass into respect core slots for soldering to loop wire portions therein. Selected component terminals also may be advantageously adapted to serve as output terminals for the resulting combined module. Power busses may additionally be incorporated within the combined module. A number of advantageous assemblies for these combined modules are also disclosed.

5 Claims, 14 Drawing Figures

COMBINED COMPONENT AND INTERCONNECTION MODULE AND METHOD OF MAKING

This is a division of U.S. Pat. application Ser. No. 48,317, filed June 22, 1970.

CROSS-REFERENCES TO RELATED PATENT APPLICATIONS

This patent application is directed to subject matter similar to that disclosed in the commonly assigned copending U.S. Pat. application Ser. No. 875,906, filed Oct. 12, 1969, for Automated Wiring System and Method, Weichien Chow, inventor, which in turn is a continuation in part of U.S. Pat. application, Ser. No. 854,413, filed Sept. 2, 1969, for Automated Wiring System and Method, now abandoned.

BACKGROUND OF THE INVENTION

It will be recognized that the manner in which electronic circuitry is interconnected and packaged is a very important factor in the design and construction of electrical apparatus and devices, particularly where integrated circuits are involved. A packaging technique which constitutes a very significant step forward in this regard is disclosed in the aforementioned patent applications. In the exemplary embodiment described in these patent applications, a packaging approach is employed in which a specially constructed interconnection module is provided which can be plugged into a printed circuit board for providing desired electrical interconnections between components thereon, such as integrated circuit modules, and which interconnection module can also be plugged into a mother board for providing interconnections between a plurality of printed circuit boards. Each such interconnection module is advantageously provided with a desired interconnection pattern using a fabrication approach in which an automatic computer-controlled winding means is employed with a continuous wire for forming wire loops on an elongated interconnection module in a predetermined manner. The wire loops are caused to engage selected slot locations of the core in a predetermined sequence. The wire loops thus formed in the slots are then electrically affixed to terminals, such as by the use of dip-soldering, infrared bonding or conductive epoxy. Next, the wire loop portions on one side of the core are removed, such as by cutting or otherwise separating the wires at predetermined locations. The predetermined sequence of wire loop formation provided by the computer-controlled winding means during the winding operation is chosen so that, after this cutting operation, the remaining loop portions provide the terminal interconnection pattern desired for the completed interconnection module. The resulting structure is then encapsulated leaving appropriate terminal portions exposed to serve as plug-in terminals.

OBJECTS AND SUMMARY OF THE PRESENT INVENTION

The present invention is directed to a structure which significantly extends the advantages of the interconnection module disclosed in the aforementioned patent applications. This is accomplished in a typical embodiment of the invention by the provision of a combined component and interconnection module having a plurality of components, such as integrated circuit modules, directly mounted to and electrically interconnected with an interconnection pattern structure which may be fabricated in a manner generally similar to those disclosed in the aforementioned patent applications. The resulting combined module has a highly significant advantage of permitting the elimination of the conventional printed circuit board or other external interconnection means normally required to provide interconnections between these components.

It is accordingly a primary object of the present invention to provide a novel and compact combined component and interconnection module which provides for the desired interconnections between the components of the module without the need for the normally required external connecting means, such as a printed circuit board.

Another object of the invention is to provide a combined module in accordance with the foregoing object which additionally includes sockets and/or other terminals to facilitate rapid and convenient electrical connection of the module to like structures and/or to other electrical devices, circuits, printed circuit boards, wire harnesses, etc.

A further object of the invention is to provide a combined module in accordance with one or more of the foregoing objects which additionally provides for the incorporation of power busses therein.

Still another object of the invention is to provide novel assemblies incorporating the combined modules of the foregoing objects.

Yet another object of the invention is to provide novel methods for making a combined component and interconnection module.

An additional object of the invention is to provide methods in accordance with the foregoing object which are economical and capable of being automated to a high degree.

The specific nature of the invention as well as other objects, uses, and advantages thereof will become clearly evident from the following detailed description of a typical embodiment taken in conjunction with the accompanying drawings in which.

Figure 10:
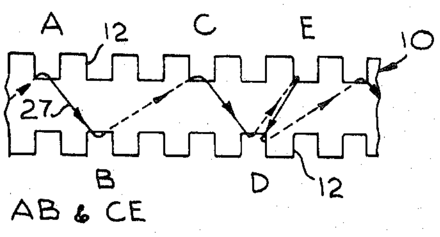
Figure 11:
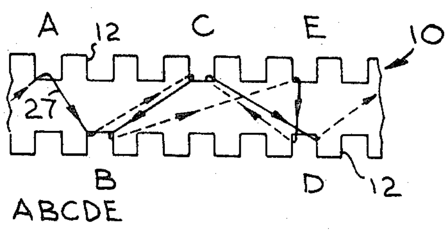
Figure 12:
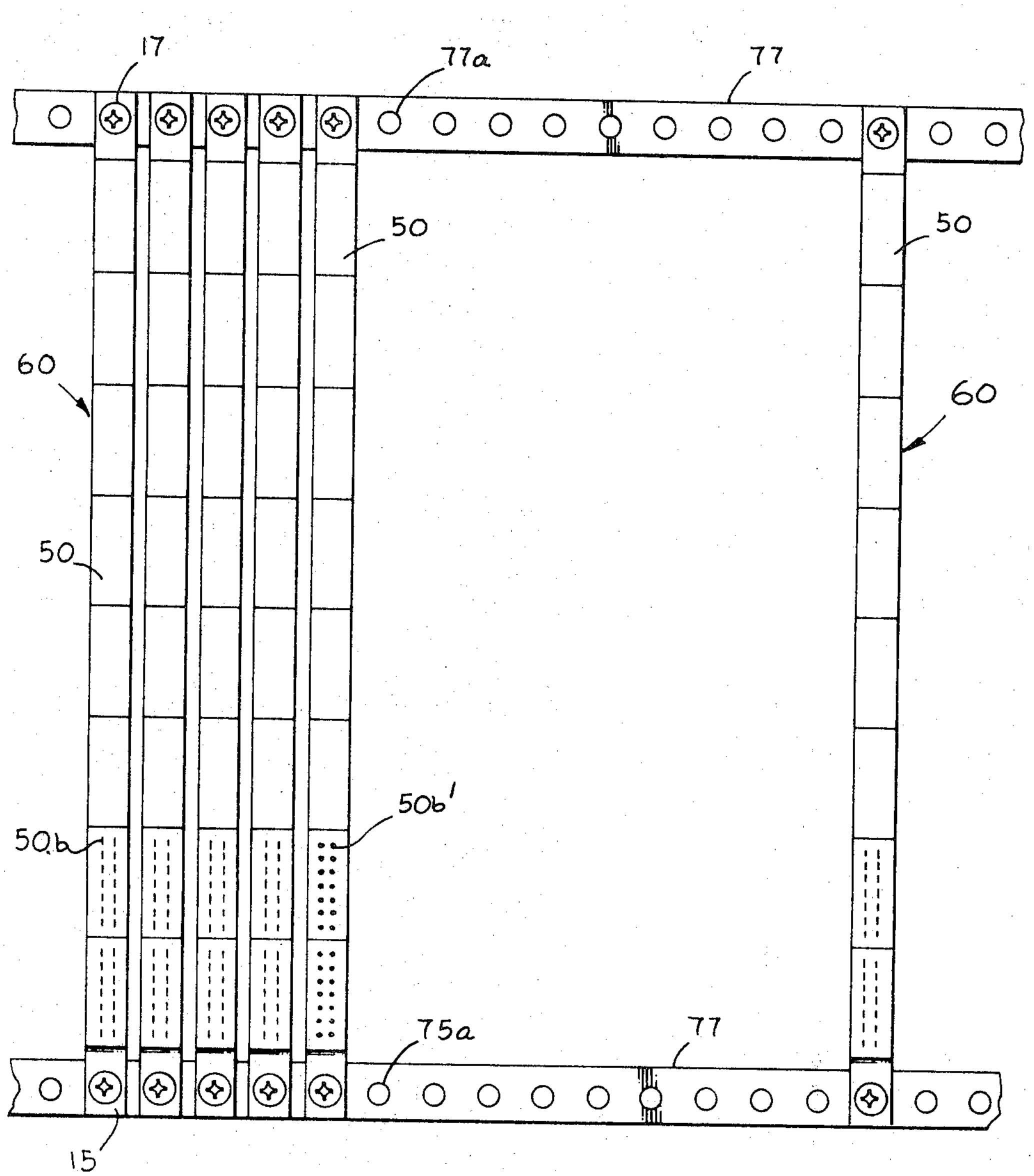
Figure 13:
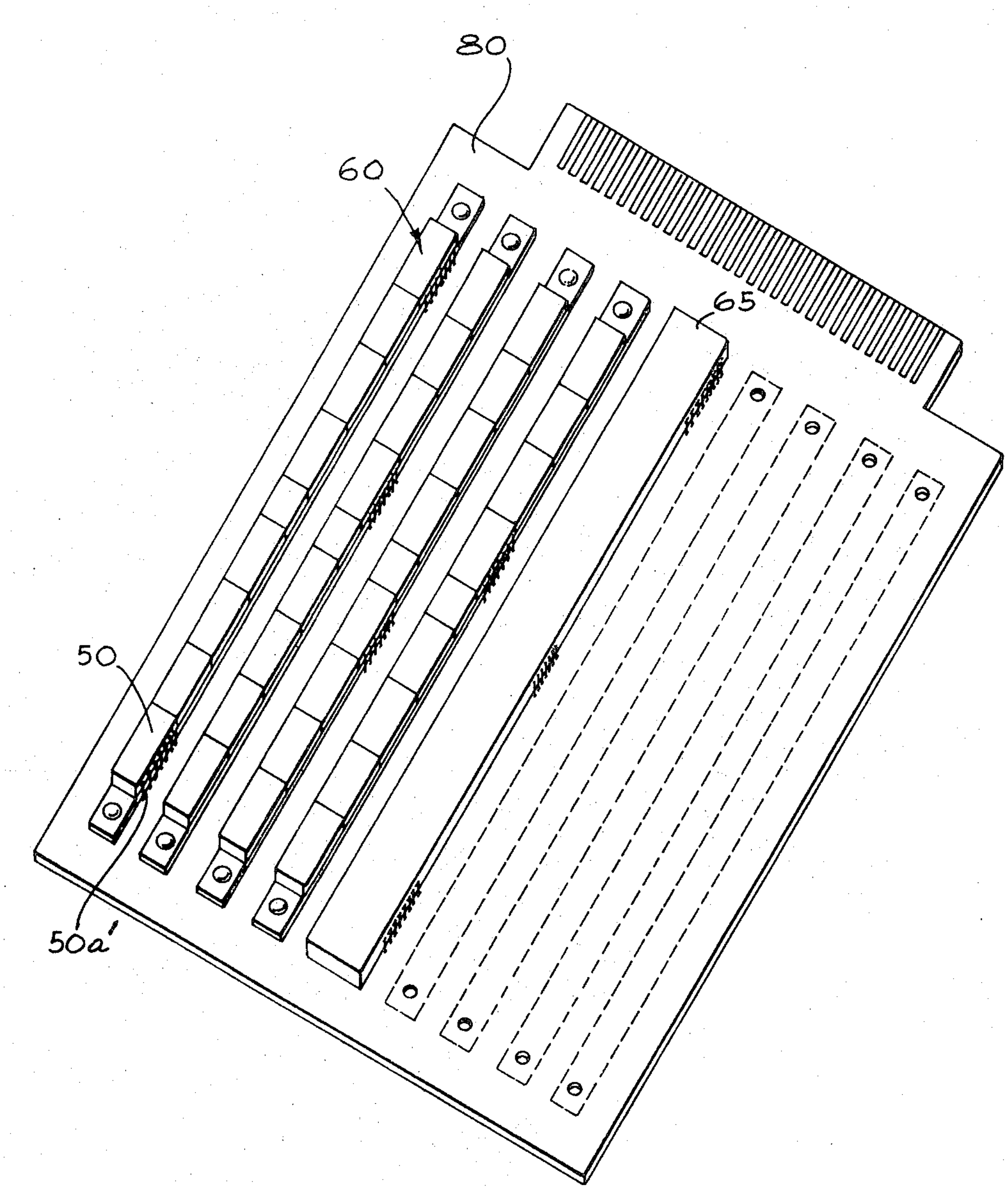
Figure 14:
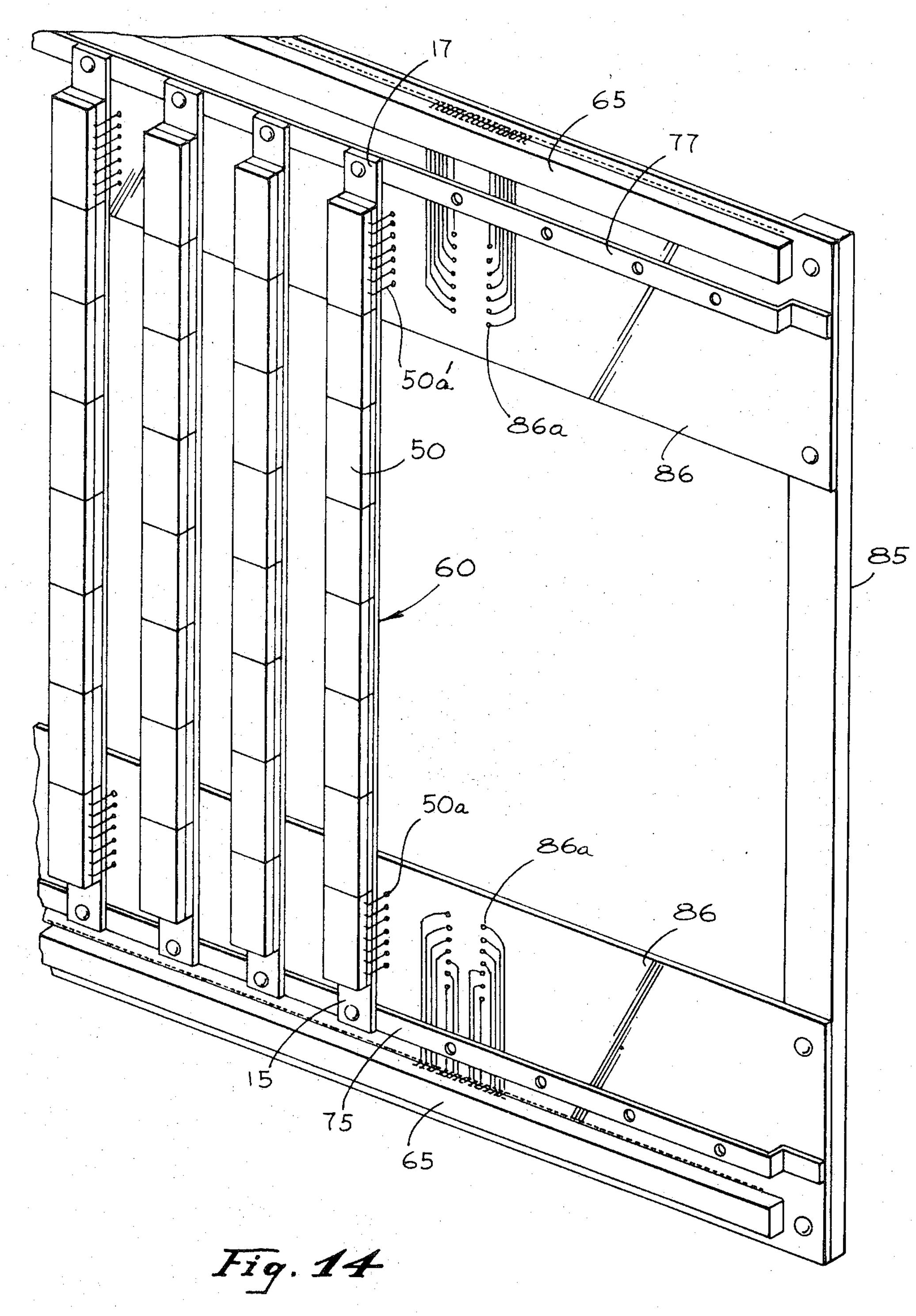

FIGS. 10 and 11 schematically illustrate how typical desired interconnections may be provided between terminals of the resultant interconnection module;

FIGS. 12–14 illustrate the manner in which a plurality of combined component and interconnection modules may typically be assembled for use with electronic apparatus.

Like numerals designate like elements throughout the figures of the drawings.

Figures 1, 4:
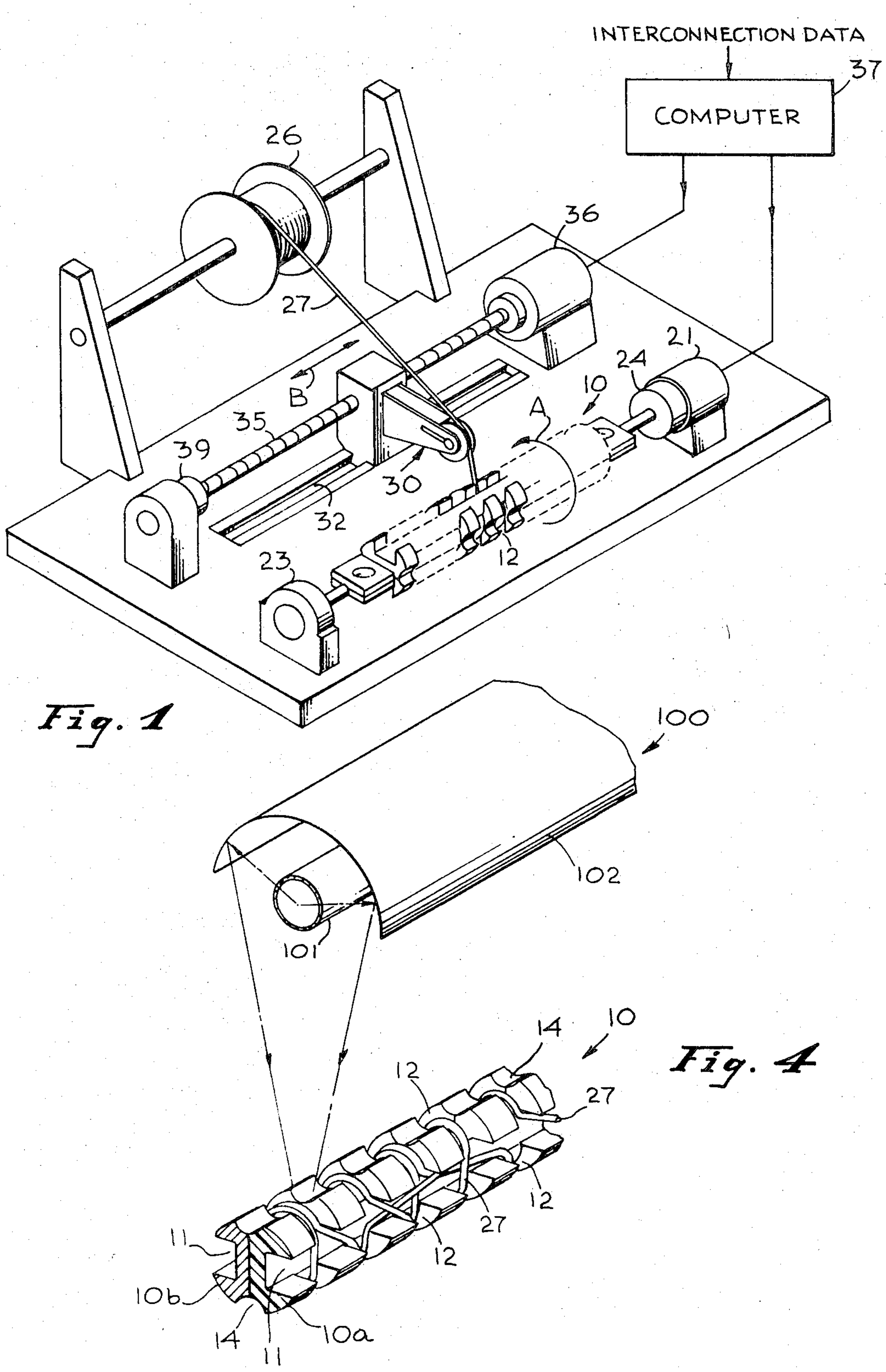
FIG. 1 is a pictorial, partially schematic representation illustrating the manner in which an automatically positionable winding means is employed to provide loops in predetermined slots of a slotted core in a predetermined sequence in order to provide a predetermined interconnection pattern therefor.
FIGS. 4 to 8 illustrate various stages and associated components involved in the fabrication of a combined component and interconnection module after the winding operation illustrated in FIGS. 1 to 3 has been performed.
Figure 2:
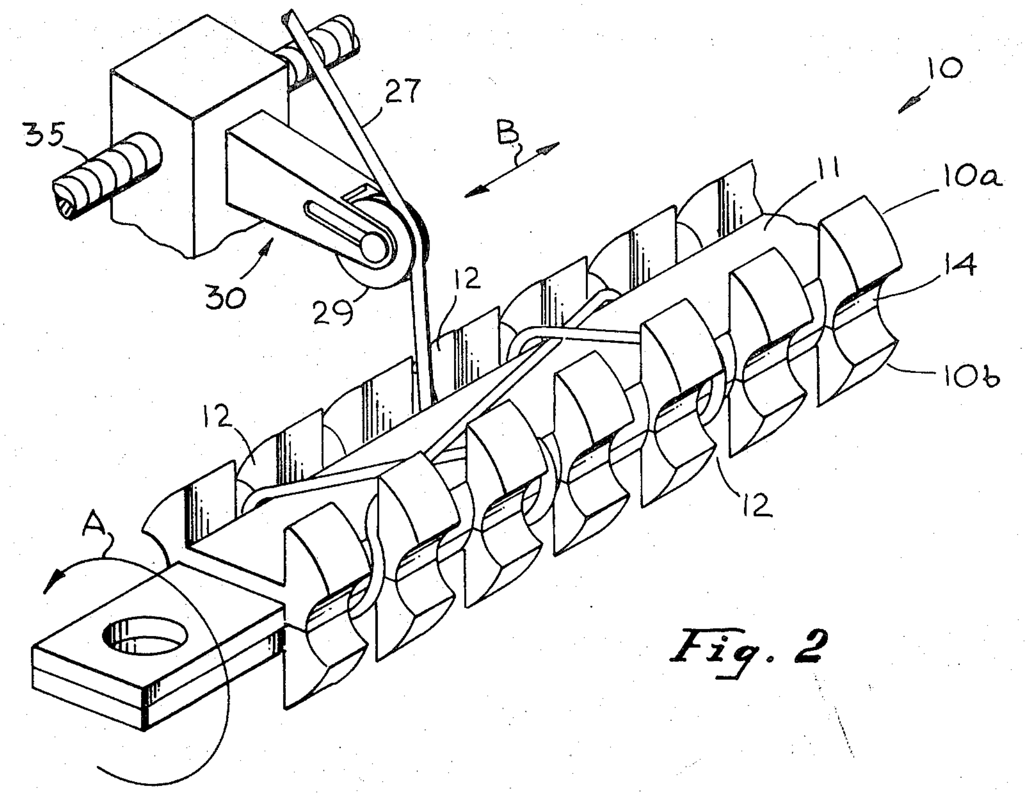
FIGS. 2 and 3 illustrate details of the winding means and slotted core of FIG. 1.
Figure 3:
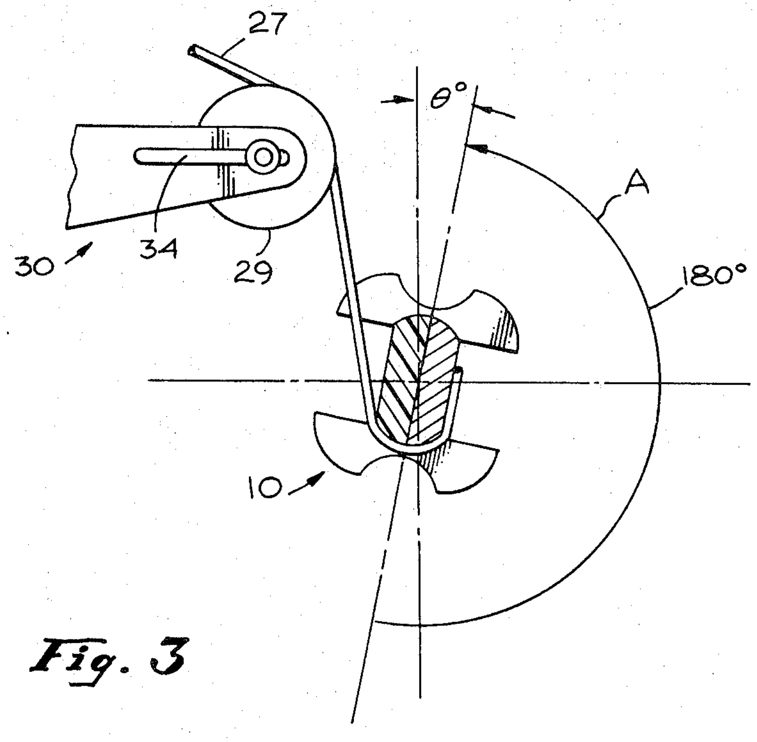

Referring to FIGS. 1 to 3, and most particularly to FIG. 1, illustrated therein is a slotted interconnection module core 10 disposed between a motor 21 and a bearing 23 for rotation in the direction indicated by the arrow A. For purposes which will shortly become evident, the interconnection core 10 is caused to rotate 180° or half-rotation steps by the use of a conventional coupling means 24 provided for this purpose and interposed between the motor 21 and the core 10. The dwell position of the core 10 is shown in FIG. 3, the angle $\phi$ being preferably as small as possible.

The core 10 may be formed of a single piece of nonconductive material, such as a plastic. However, for reasons which will become evident hereinafter, it is preferred (as shown, for example, in FIG. 2) to form the core 10 from two separable portions, a nonconductive core portion **10*a* and a rigid metal core portion 10*b* which remain together during the winding operation. Where the core 10 is relatively long, such as greater than 12 inches, it is further preferred to form the nonconductive core portion 10*a* from a plurality of separate pieces (not shown) placed end to end and supported on the metal portion 10*b*, such as by pins or recesses (also not shown) provided therein. As also shown in FIG. 2, the core 10 includes wire receiving slots 12 and cavities 11 for receiving the wire 27** during the winding operation.

As shown in FIG. 1, a bobbin 26 having a continuous insulated wire 27 wound thereon is mounted for rotation in a conventional manner so that tension on the wire 27 unwinds the wire from the roller 26 to permit automatic wire feed therefrom as required during the winding operation on the interconnection module core 10. The wire 27 is applied to the core 10 via a rotatable roller 29. The roller 29 is carried by a wire positioning means 30 which is constructed and arranged to cooperate with a track 32 and a lead screw 35 so that the position of the wire 27 along the core 10 is controllable (as indicated by arrows B) in response to rotation of the lead screw 35. A stepping motor 36 receives one end of the lead screw 35 and a bearing 39 receives the other end of the lead screw 35, whereby desired controlled step-by-step rotation of the lead screw 35 in either direction may be provided. An alternate arrangement is to let the lead screw 35 move the module core 10 while the winding means 30 remains stationary. The tension on the wire 27 may be adjusted by means of an adjusting slot 34 which controls the position of the roller 29 on the winding means 30.

Still with reference to FIG. 1, a computer 37, or other suitable data processing means, operates in response to suitably applied interconnection data to provide operating signals for the motors 21 and 36 so as to cooperatively control the step-by-step positioning of the winding means 30 and the 180° or half-rotations of the interconnection module core 10 so as to form loops of wire thereon (FIG. 2) passing through predetermined ones of the wire receiving slots 12 (FIG. 2) in a predetermined sequence, as determined by the interconnection data applied to the computer 37.

It will be understood that typical operation of the apparatus of FIG. 1 may be in cycles. During each cycle the positioning of the winding means 30 and the 180° rotation Of the core 10 occur alternately. More specifically, operation during each cycle is such that, with the core 10 held stationary in its dwell position (FIG. 3), the computer 37 first causes the winding means 30 (and thus the wire 27) to be stepped to a position adjacent the particular slot 12 which is next to receive the wire 27, as determined by the interconnection data applied to the computer 37. When the winding means 30 has been thus positioned, the computer 37 then causes the core 10 to be given a half of 180° rotation, resulting in the wire entering the desired slot. It will be understood that any number of such cycles may be consecutively performed as required by the interconnection data until the continuous wire 27 from the bobbin 26 is formed intO the final desired loop arrangement on the core 10. FIG. 2 illustrates an intermediate stage in the formation of a typical plurality of loops. Obviously, the starting and ending portions of the wire wound on the core 10 may be secured thereto in any suitable manner such as, for example, by using an adhesive, or by wrapping or tying to an appropriately provided means on the core.

Having formed loop wires 27 on the core 10 passing through predetermined slots 12 in a predetermined sequence, as determined by the interconnection data fed to the computer 37 (FIG. 1), the loop wires 27 are then prepared for subsequent soldering of terminals thereto. A typical manner in which this may be accomplished is illustrated in FIG. 4. An infrared meltable insulation, such as polyurethane, is employed for the wire 27, and the solder cream is applied to selected portions of the wires 27 residing in opposed grooves 14 provided along the length of the core 10 for this purpose. As schematically illustrated in FIG. 4, an infrared lamp unit 100 including an infrared source 101 and a reflector 102 provides a high intensity narrow infrared beam which is directed along each groove 14 for a time sufficient to melt the polyurethane insulation of the wire 27 and the solder cream so as to thereby effectively strip and tin the wire portions in the grooves 13.

Figure 5:
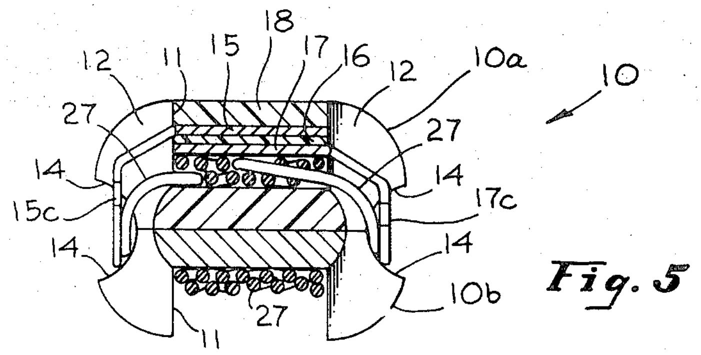
Figure 6:
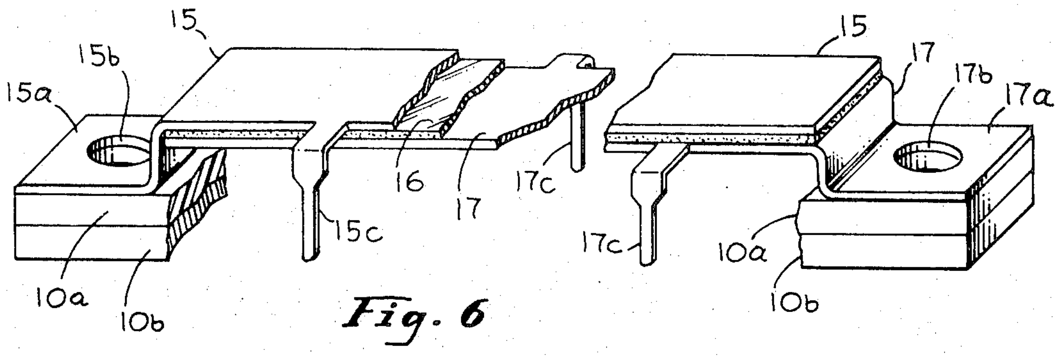
Figure 7:
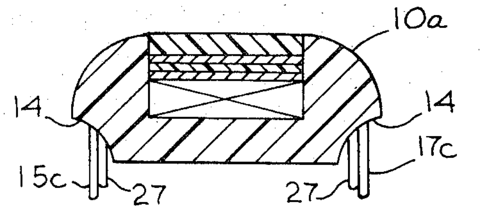

It will be understood with reference to the cross-sectional view of FIG. 5 and the fragmentary perspective view of FIG. 6 that the cavity 11 of the upper portion **10*a* of the core 10 is next provided with a pair of power buss strips 15 and 17 separated by a thin layer of insulation 16 and secured in the cavity 11 above the wires 27 by a suitable potting compound 18. As will be seen from FIG. 6, each of the power buss strips 15 and 17 include a bent over flange portion 15*a* or 17*a* at one end having a hole 15*b* or 17*b* therein for cooperation with a like hole at a respective end of the upper core portion 10*a* of the core 10. Further illustrated in FIG. 6 (and also in FIG. 5) is the manner in which terminals 15*c* and 17*c* may be provided extending from both sides of the power buss strips 15 and 17 into selected slots 12 (FIG. 2) of the core 10. For purposes of illustration the cross-sectional view of FIG. 5, and also the cross-sectional view of FIG. 7, are taken through a slot 12 (FIG. 2) which contains a power buss strip terminal 15*c* and a wire 27 in the right slot, and a power buss strip terminal 17*c* and a wire 27 in the left slot. Typically, however, only relatively few of the slots 12 actually receive a power buss terminal 15*c* or 17*c*.**

It will be evident to those skilled in the art that the power buss strips 15 and 17 of FIGS. 5 and 6 may be provided in various different ways besides that illustrated. The provision of the power buss strips 15 and 17 in the particular manner shown has the advantage of being able to provide the predetermined capacitance therebetween normally required in conventional circuitry.

The next step in the fabrication process involves removal of the lower metal core portion 10*b* and cutting of the loop wires 27 to provide the resulting structure illustrated in the cross-sectional view of FIG. 7. As will be explained in more detail later on herein, the remaining loop wire portions serve to provide the desired interconnection pattern for the completed module.

Figure 8:
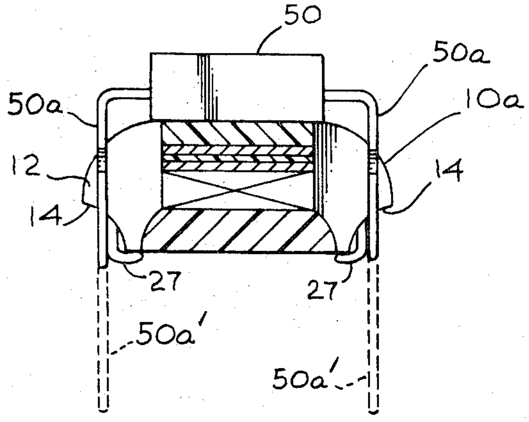
Figure 9:
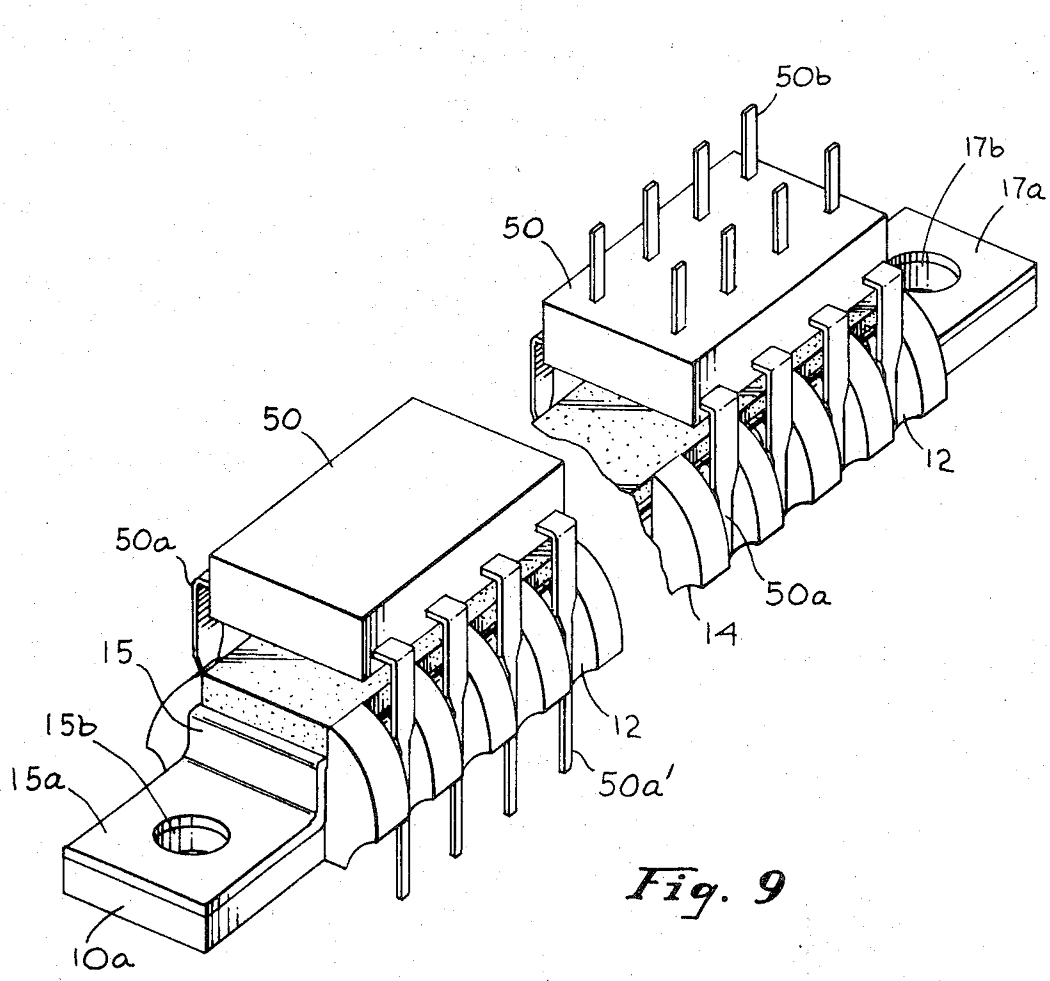
FIG. 9 is a perspective view illustrating an exemplary form of completed combined interconnection and component module which may be fabricated in accordance with the invention.

Continuing with the description of the fabrication of an exemplary interconnection module in accordance with the invention, the next step, as illustrated in the cross-sectional view of FIG. 8 and the perspective view of FIG. 9, is to mechanically and electrically attach to the structure of FIG. 7, the various components 50 which are to be interconnected by the module interconnection pattern. For this purpose, each of the components 50 are provided with perpendicularly depending terminals 50*a*, or extra long terminals 50*a'* (indicated by dashed lines in FIG. 8) which pass through respective slots 12 of the core portion 10*a* when the components 50 are mounted thereto. Thus, both the desired mechanical and electrical connections of the components 50 to the core portion 10*a* may simultaneously be achieved by soldering these component terminals 50*a* and 50*a'* to the adjacent stripped and tinned wire loop portions 27 in the respective slots 12, such as by the use of well known solder reflow techniques. In addition, by the use of the extra long component terminals 50*a'*, output terminals may also be provided for the module at the same time.

It is to be understood with respect to FIGS. 8 and 9 that a power buss strip terminal 15*c* or 17*c* (FIG. 7) could be provided in a slot 12, as well as a component terminal 50*a* or 50*a'* along with one or more loop wire portions 27. However, it is preferable that the locations of the power buss strip terminals 15*c* and 17*c* be chosen so as to be located between the component terminals 50*a* or 50*a'*, so that each slot 12 will receive no more than one terminal in addition to the loop wire portions 27. It is also to be understood that, although each component 50 in FIG. 9 is shown as having four terminals 50*a* or 50*a'* depending from each side, it is apparent that larger numbers of component terminals could be provided in a similar manner.

It is further to be understood that each of the components 50 illustrated in FIGS. 8 and 9 may typically comprise an integrated circuit module or any other desired electronic circuit. Also, a component 50 may advantageously contain output terminals 50*b* which are in addition to, or alternative to, those provided by the terminals 50*a'*, so as to thereby further facilitate interconnection of the completed module to other devices, apparatus or connectors. If desired, sockets could be provided for a component 50 instead of the terminals 50*b*.

After the terminals and wire portions in the slots of the structure of FIG. 9 have been soldered, the resulting module is ready for use, and has the advantage that the wire portions and terminals in each slot 12 are readily available for testing purposes. However, if desired, the structure of FIG. 9 may be encapsulated so as to leave only its output terminals 50*a'* and 50*b* exposed. The resulting combined component and interconnection module may typically have overall dimensions of 12 inches × 1 inch × 1 inch.

Referring now to FIGS. 10 and 11, schematically illustrated therein are two examples showing how a desired interconnection pattern may typically be provided by appropriate control of the formation of the loop windings on the interconnection module core 10 using the apparatus of FIGS. 1 to 3. The solid lines in FIGS. 10 and 11 represent loop wires 27 which traverse first predetermined paths, specifically the paths constituted by the outer surface of the core portion 10*a* (as viewed in FIG. 2), while the dashed lines represent loop wires 27 which traverse second predetermined paths, specifically the paths constituted by the outer surface of the core portion 10*b*. Since the loop wires 27 indicated by the dashed lines are cut and removed during the fabrication of the module, the remaining loop wires 27 will be those represented by the solid lines, and it is these remaining wires which provide the electrical interconnections in the completed module. It will thus be evident that the exemplary loop pattern of FIG. 10 will result in providing an electrical connection between the terminals in slots A and B, and an independent electrical connection between the terminals in slots C and E, while the exemplary loop pattern of FIG. 11 will result in providing an electrical connection among all of the terminals in slots A, B, C, D, and E.

It should thus be pattern from FIGS. 10 and 11 how any desired interconnection Pattern may be provided for the completed module by appropriate choice of the order and arrangement of loop formation on the core 10. Consequently, the computer 37 in FIG. 1 need merely operate in response to the interconnection data applied thereto to control the positioning of the winding means 30 to wind a loop pattern on the core 10 such that desired electrical connections between the slots 12 are made via the outer surface of the core portion 10*a*, while undesired electrical connections are made via the outer surface of the core portion 10*b*. Cutting of the bottom loop wire portions will then provide the desired interconnections for the completed module. Such operation of a computer or data processing means can readily be provided by those skilled in the art based upon the disclosure provided herein.

Having described how an exemplary combined component and interconnection module 50 may be fabricated in accordance with the invention, typical uses thereof will now be considered with reference to FIGS. 12 to 14.

FIG. 12 illustrates one type of assembly which may be employed for a plurality of combined component and interconnection modules 60 fabricated as described above in which the combined modules 60 are mounted in parallel between a pair of power busses 75 and 77, with additional combined modules (not shown) also being provided on the opposite side of the power busses 75 and 77 if desired. In such an assembly, output terminals 50*b* or sockets 50*b'* provided on selected ones of the components 50 are used to provide external electrical connections, such as via the terminals of an appropriate wiring harness.

FIG. 13 illustrates another type of assembly in which the output terminals 50*a'* of a plurality of combined modules 60 are plugged into a conventional type of printed circuit board 80 with interconnections therebetween being made via the board and a plug interconnection module 65 of the type disclosed in the aforementioned patent applications.

FIG. 14 illustrates a further type of assembly in which two printed circuit boards 86 are mounted spaced apart on frames 85, each board 86 containing sockets 86*a*, a power buss 75 or 77, and an interconnection module 65 of the type disclosed in the aforementioned patent applications, whereby to permit receiving a plurality of parallel combined modules 60 having output terminals 50*a'* emanating from the end components 50 thereof. It will be understood that a duplicate of the arrangement shown in FIG. 14 could also be provided on the opposite side of the frames 85.

Although the present invention has been described in connection with particular exemplary embodiments thereof, it is to be understood that the invention is subject to many possible variations and modifications in construction, arrangement, method of fabrication, manner of assembly, and use within the scope of the invention as defined by the appended claims.

The embodiments of the invention in which an exclusive property or privilege is claimed are defined as follows:

1. A combined component and interconnection module comprising:

a non-conductive elongated core having first and second spaced parallel rows of slots extending axially along the length of the core, a predetermined electrical interconnection pattern comprised of a plurality of flexible insulated wires interconnecting said slots in a predetermined manner, said electrical interconnection pattern being disposed in an axially extending cavity provided in said core between said row of slots and with a portion of the wire in each of predetermined ones of said slots having its insulation removed for electrical interconnection purposes, a pair of axially power buss strips having electrical insulation therebetween extending axially along the length of said core and disposed in said cavity above said electrical interconnection pattern, said strips having a plurality of perpendicularly depending power buss terminals at predetermined locations along at least one edge thereof which extend into predetermined ones of said slots so as to be adjacent the respective uninsulated portions of said wires in said slots, a plurality of electrical circuit components of generally rectangular planar shape disposed in an axial row along said core, each component having a plurality of perpendicularly depending component output terminals on both sides thereof respectively extending into predetermined ones of said slots so as to be adjacent the respective uninsulated portions of said wires in said slots, said component output terminals having sufficient length to pass entirely through their respective slots and extend beyond said core to serve as output terminals for said module, and electrical connection means provided in predetermined ones of said slots for respectively electrically connecting uninsulated portions of said flexible wires with said power buss terminals and component terminals in said slots, said electrical connection means also serving to mechanically mount and support said component along said core.

2. The invention in accordance with claim 1, wherein at least one of said components includes an additional plurality of perpendicularly depending output terminals extending in a direction opposite to the component output terminals extending into said slots, said additional component output terminals being adapted to permit external connections to be made thereto.

3. The invention in accordance with claim 1, wherein said module is encapsulated leaving only said component output terminals exposed.

4. The invention in accordance with claim 1, wherein said core has a mounting hole at each end thereof, and wherein one power buss strip has a hole at one end thereof aligned with the core mounting hole at that end and the other power buss strip has a hole at the opposite end thereof aligned with the core mounting hole at said opposite end.

5. The invention in accordance with claim 3, wherein mounting structure is provided to which a plurality of said modules are mounted in parallel, said mounting structure including a pair of parallel power busses spaced in correspondence with said core mounting holes and having holes therein for use in mounting said modules.

* * * * *